3,032,070
SEALED THERMAL INSULATION SECTIONS IN PIPE CONDUITS
Alexander H. Isenberg, Woodside, Calif.
(P.O. Box 88, Palo Alto, Calif.)
Filed Jan. 28, 1958, Ser. No. 711,710
1 Claim. (Cl. 138—149)

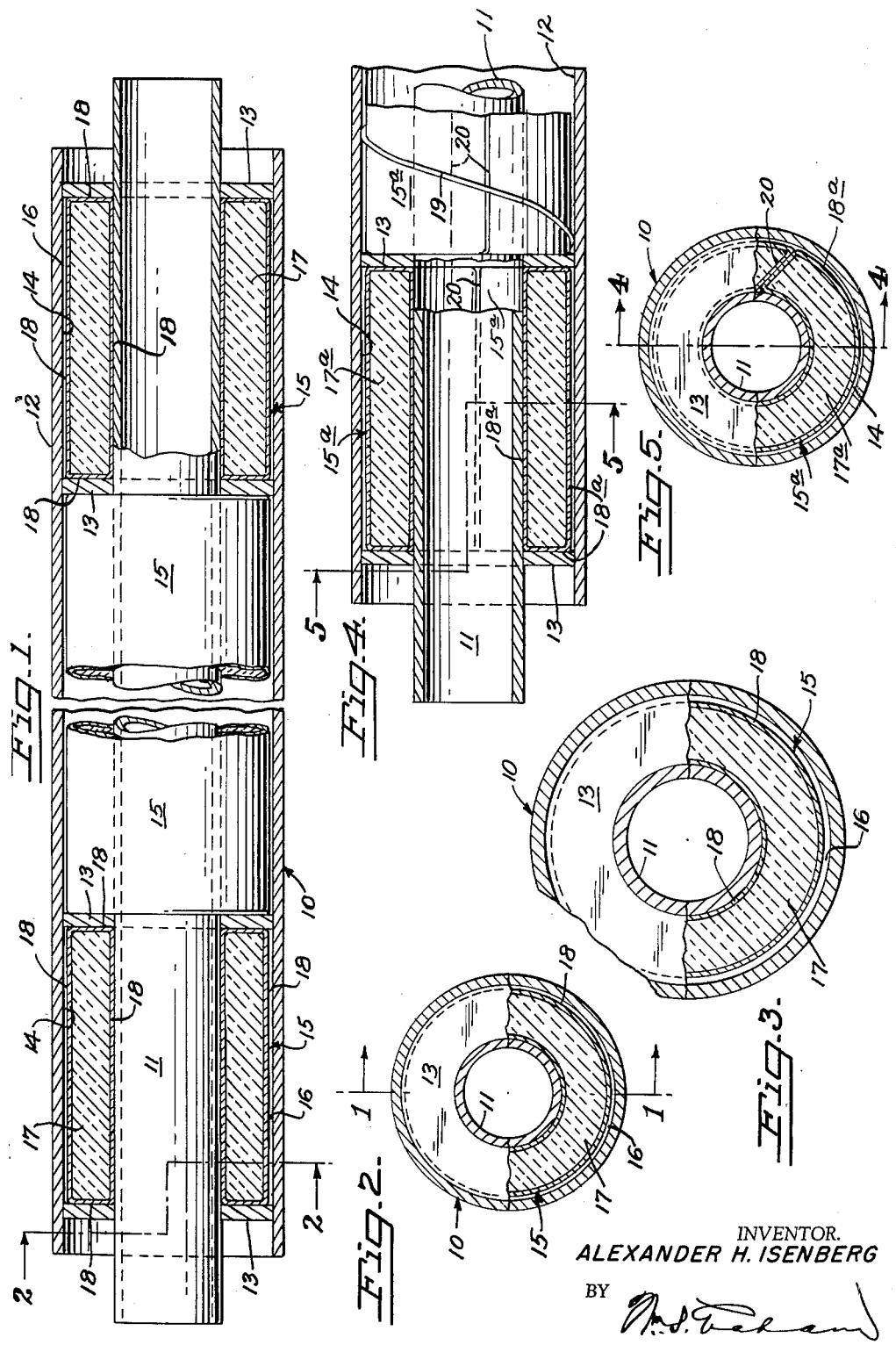

This invention relates to sealed thermal insulation sections in thermally insulated pipe conduits and relates more particularly to separately sealed moisture impervious sections compartmentalized in prefabricated conduit units around a conveyor pipe within an outer casing.

Broadly, the thermal insulation of conduits is well known in which the insulation body may be packed in premolded form or packed loosely in bulk around a conveyor pipe within an outer casing. Since such insulation material is usually quite porous and absorbent of moisture, the known conduit structures have the disadvantage that in case of a leakage either in the conveyor pipe or the surrounding outer casing, or the flooding of a subsurface conduit ditch, during construction, the entire insulation medium may be damaged, rendered ineffective or destroyed.

An object of the present invention is to provide an insulation medium in thermally insulated conduits in which the insulation means is formed of compartmentalized separate imperviously sealed thermal insulation sections, so that if moisture enters the outer casing none of the separately sealed sections will be damaged, or if one section is damaged other insulation sections will not be affected. Such compartmentalized sections are especially advantageous in thermally insulated conduits formed of prefabricated conduit units as herein exemplified.

Briefly described, the invention comprises imperviously sealed insulation sections compartmentalized in thermally insulated conduits which have a conveyor pipe axially enclosed in spaced relation within a suitable outer casing, and the sealed thermal insulation sections in the space between said conveyor pipe and outer casing, the insulation sections each being enclosed in a suitable moisture impervious jacket which may be cylindrical in form, or may be of flexible blanket form for wrapping around the conveyor pipe. Since it is desirable that such sections of insulation shall not bear the weight of the conveyor pipe, nor scrape against the outer casing, and in order that the conveyor pipe may expand and contract longitudinally responsive to change of temperature, the conveyor pipe is supported with relation to the outer casing by suitable weight-supporting spacing members therebetween radial to the conveyor pipe, the spacing members being of slightly greater diameter than the insulation sections for providing the desired slidability of the conveyor pipe and insulation sections longitudinally in the outer casing as an assembled unit.

Without limitation of the scope of the invention, one advantageous use thereof is in prefabricated conduit units which are made as a unitary assembly at a plant and shipped as such asesmbled units to place of installation, it being preferred that in prefabricating such conduit units the conveyor pipe, the spacer members and the sealed insulation sections be first assembled and then slid as a unitary assembly into the outer casing.

Preferred forms in which the invention may be exemplified are described herein and illustrated in the accompanying drawing, in which:

FIG. 1 is a fragmentary broken longitudinal transverse section of the invention on line 1—1 of FIG. 2.

FIG. 2 is a transverse section on line 2—2 of FIG. 1 partly broken away.

FIG. 3 is an enlarged fragmentary section similar to FIG. 2.

FIG. 4 is a fragmentary longitudinal section of a modified form of the invention, on line 4—4 of FIG. 5.

FIG. 5 is a transverse section on line 5—5 of FIG. 4, partly broken away.

Referring to the drawing in which like reference characters indicate similar parts in the several views of corresponding forms of the invention, and referring firstly to FIGS. 1 to 3, a thermally insulated conduit unit is generally indicated 10 in which 11 is an elongated conveyor pipe, and 12 is an outer casing coaxially radially spaced from the conveyor pipe, and which, in the present exemplification, is preferably of relatively heavy metal to provide a weight-supporting outer casing, the conveyor pipe extending beyond the ends of the outer casing.

Between the conveyor pipe 11 and the outer casing 12 there are relatively longitudinally spaced annular disc ring spacer members 13 mounted radially circumferentially relative to the conveyor pipe and having outer diameter substantially similar to the inner diameter of the outer casing, for maintaining the conveyor pipe spaced from the outer casing and thus transmitting the weight of the conveyor pipe to the outer casing. The central opening of these annular spacer members is substantially similar to the outer diameter of the conveyor pipe and the spacer members and openings thereof are concentric with the conveyor pipe, close slidable clearances being allowed relative to the outer casing and the conveyor pipe. The spacer members may be, if desired, of dielectric material to prevent electrolysis of the conveyor pipe and casing or may be of any suitable electrical non-conducting material. Because of the aforesaid slidable clearances, the conveyor pipe has a degree of longitudinal slidability to accommodate thermal expansion and contraction. The spacer members 13 are relatively spaced longitudinally of the conduit at any suitable distances whereby compartments 14 are provided longitudinally therebetween and radially between the conveyor pipe and outer casing.

In each of the compartments 14 between the conveyor pipe and outer casing is an annular encased insulation section or unit 15 which is completely closed and moisture-imperviously sealed at both its inner and outer circumferences and at its ends. Such insulation sections are of suitable dimension longitudinally to snugly fit into the compartments 14 between the spacer members and are of inner circumferential dimension to snugly encircle the conveyor pipe. The outer diameter of the insulation sections is slightly less than the outer diameter of the spacer members allowing a non-contact clearance 16 between the insulation sections and outer casing, whereby the conveyor pipe, spacer members, and insulation sections may be assembled as a unit and slid into the outer casing, with the insulation sections free of sliding contact with the outer casing.

The insulation sections may be hollow shells or jackets and filled with air since confined air may satisfactorily serve for thermal insulation. However, because these conduits, both in manufacture and installation are subject to relatively rough handling, it is preferred, as exemplified herein, that each insulation section shall comprise a body of any well-known and acceptable thermal insulation material 17, having a physical body such as rockwool, fibreglass, asbestos, magnesia or the like, enclosed in a sheet metal or encasing jacket or envelope 18 of moisture-impervious sheeting imperviously sealed against entry of moisture, the exemplified form of such sheeting in FIGS. 1 to 3 being relatively thin form-retaining aluminum sheet, which will permit sufficient slidability of the conveyor pipe therein for expansion and contraction. For conduit installations adapted for relatively low temperatures, the insulation body material 17 may be imperviously enclosed in a resinous plastic which may be sprayed as a liquid and hardens in situ. These materials are tough, tenacious and deformable if dented, but resistant to fracture and are non-brittle, and therefore are adapted for the rough treatment to which they are subjected in actual practice of installation of conduits in the field of operation; and they are inert to decomposition by heat at any practicable temperature to which the conduits may be normally subjected in actual operation, as well as being highly resistant to oxidation and rust. As shown in FIGS. 1 to 3, these insulation sections may be preformed as cylindrical bodies having closed ends and having a tubular opening therethrough whereby they may be slid upon the conveyor pipe, with spacer members between the opposed ends of the next adjacent sections.

At the opposite ends of the conduit unit it is preferred that the conveyor pipe extend beyond the outer casing and that the insulation sections shall terminate in spaced relation inwardly relative to the terminal ends of both the conveyor pipe and the outer casing, since if such insulation units extend beyond the ends of the outer casing, the sheath enclosing the insulation units may not be adapted for the rough handling and resultant damage to which the conduit units may be subjected in storage, transit and installation. It is further preferred that a spacer member 13 shall be mounted at each opposite end of the series of aligned insulation sections and that such end spacer members shall be inset from the adjacent terminal ends of the outer casing to facilitate making of a field joint.

In the modification of FIGS. 3 and 4 the outer casing, conveyor pipe, and spacer members are similar to corresponding parts in FIGS. 1 and 2 and have been so indicated by reference characters in the drawing. The modification is in the insulation sections 15a, which comprise flexible blankets of insulation material of sufficient length to encircle the conveyor pipe and being encased in a moisture impervious envelope 18a such as flexible aluminum foil, which is characterized by the same physical qualities as heretofore described relative to the jacket or envelope 18 the longitudinal end walls of the envelope being angular to the plane whereby, when the blanket is wrapped around the conveyor pipe, the confronting ends of the envelope which are longitudinal of the conveyor pipe wall provide an overlapping scarf-like joint, as indicated at 20. Any suitable binder cord 19 may be wrapped circumferentially of the insulation blanket member for positioning it on the conveyor pipe until it is slid into the outer casing.

As stated, in prefabricating a conduit unit the insulation sections 15 and spacer members 13 are mounted on the conveyor pipe as an assembly, whereupon the assembly is slid into the outer casing. The conveyor pipe extends beyond the opposite ends of the outer casing, so that a field joint between end-to-end conduit units may be affected in a conduit system by welding the extended abutting ends of the conveyor pipes. After such welding the welded joint may be packed with suitable thermal insulation material such as is commonly done in making a field joint, or may be packed with a blanket unit of insulation material as herein described which manifestly would be of suitable width relative to the longitudinal axis of the joint.

Having described the invention what is claimed as new and patentable is:

A thermally insulated conduit unit comprising an outer casing, a conveyor pipe longitudinally within the outer casing and radially spaced therefrom, circular disc spacer members circumferentially of the conveyor pipe and extending radially between the conveyor pipe and outer casing, said spacer members being slidable relative to the outer casing and the conveyor pipe and relatively longitudinally spaced providing compartments therebetween circumferentially of the conveyor pipe, and relatively separate sections of thermal insulation members mounted circumferentially of the conveyor pipe in said compartments between the spacer members, the insulation section members having slightly less diameter than the spacer members whereby there may be slidable clearance between said insulation section members and the outer casing, each of the thermal insulation section members including a body of thermal insulation material imperviously sealed in an encasing jacket shell of tough tenacious sheet material which is inert to decomposition by heat of practical operating temperatures in such conduits.

References Cited in the file of this patent

UNITED STATES PATENTS

| | | |
|---|---|---|
| 651,425 | McConnell | June 12, 1900 |
| 1,029,652 | White | June 18, 1912 |
| 1,140,633 | Trucano | May 25, 1915 |
| 2,116,302 | Chernosky | May 3, 1938 |
| 2,330,966 | Gottwald et al. | Oct. 5, 1943 |
| 2,658,527 | Kaiser | Nov. 10, 1953 |
| 2,761,949 | Colton | Sept. 4, 1956 |
| 2,790,464 | Stephens et al. | Apr. 30, 1957 |
| 2,872,947 | Isenberg | Feb. 10, 1959 |
| 2,924,245 | Wilson | Feb. 9, 1960 |
| 2,937,662 | Green | May 24, 1960 |

FOREIGN PATENTS

| | | |
|---|---|---|
| 230,696 | Great Britain | Mar. 19, 1925 |
| 279,913 | Great Britain | Oct. 27, 1927 |
| 512,322 | Germany | Nov. 11, 1930 |
| 1,091,071 | France | Oct. 27, 1954 |